United States Patent
Conlon

(10) Patent No.: US 10,615,427 B2
(45) Date of Patent: *Apr. 7, 2020

(54) FLOW FIELD PLATES IN FUEL CELLS

(71) Applicant: INTELLIGENT ENERGY LIMITED, Loughborough, Leicestershire (GB)

(72) Inventor: Christopher Conlon, Loughborough (GB)

(73) Assignee: INTELLIGENT ENERGY LIMITED, Loughborough (GB)

(*) Notice: Subject to any disclaimer, the term of this patent is extended or adjusted under 35 U.S.C. 154(b) by 26 days.

This patent is subject to a terminal disclaimer.

(21) Appl. No.: 15/820,862

(22) Filed: Nov. 22, 2017

(65) Prior Publication Data

US 2018/0097241 A1    Apr. 5, 2018

Related U.S. Application Data

(63) Continuation of application No. 14/761,925, filed as application No. PCT/GB2014/050106 on Jan. 15, 2014, now Pat. No. 9,853,297.

(30) Foreign Application Priority Data

Jan. 17, 2013 (GB) .................................. 1300853.7

(51) Int. Cl.
*H01M 8/0202* (2016.01)
*B21D 53/04* (2006.01)
(Continued)

(52) U.S. Cl.
CPC .......... *H01M 8/0202* (2013.01); *B21D 13/02* (2013.01); *B21D 22/02* (2013.01); *B21D 37/20* (2013.01);
(Continued)

(58) Field of Classification Search
CPC ........ B21D 13/02; B21D 22/02; B21D 37/20; B21D 53/04; H01M 8/0202; H01M 8/0206; H01M 8/026
See application file for complete search history.

(56) References Cited

U.S. PATENT DOCUMENTS 6,821,471 B2   11/2004  Olsson
7,194,388 B2    3/2007  Chu et al.
(Continued)

FOREIGN PATENT DOCUMENTS

DE    102010052738 A1    5/2012
EP        1348499 A2    1/2003
(Continued)

OTHER PUBLICATIONS

"Development of Press Processing Art of Metal Separator for Fuel Cells"; Japan Metal Stamping Association entrusted by Kanto Bureau of Economy, Trade and Industry; Mar. 2010; p. 21-26.
(Continued)

*Primary Examiner* — Carlos Barcena
(74) *Attorney, Agent, or Firm* — BakerHostetler

(57) ABSTRACT

A method of producing a flow field plate for a fuel cell comprises over-profiling relief features in a die set to more accurately reproduce the intended flow channel features in the pressed plate. The process includes determining a target relief profile of features extending across the plate along at least a first dimension of the plate, modulating the relief profile with an over-profiling parameter, as a function of the first dimension; forming a die with the modulated relief profile; and pressing a flow field plate using the die with modulated relief profile to thereby produce the unmodulated, target relief profile in the flow field plate.

11 Claims, 3 Drawing Sheets

(51) Int. Cl.
   *B21D 13/02*     (2006.01)
   *B21D 37/20*     (2006.01)
   *B21D 22/02*     (2006.01)
   *H01M 8/026*     (2016.01)
   *H01M 8/0206*    (2016.01)

(52) U.S. Cl.
   CPC ............ *B21D 53/04* (2013.01); *H01M 8/026* (2013.01); *H01M 8/0206* (2013.01)

(56) References Cited

U.S. PATENT DOCUMENTS

| | | |
|---|---|---|
| 2008/0134496 A1 | 6/2008 | Bae |
| 2010/0095517 A1 | 4/2010 | Yang et al. |
| 2012/0189484 A1 | 7/2012 | Zobl et al. |
| 2018/0097241 A1 | 4/2018 | Conlon |

FOREIGN PATENT DOCUMENTS

| | | |
|---|---|---|
| JP | 2002-126834 A | 5/2002 |
| JP | 2006-185856 A | 7/2006 |
| WO | WO 2014/111705 A1 | 7/2014 |

OTHER PUBLICATIONS

Japan Application No. 2015-553163; Notice of Grounds of Rejection; dated Feb. 6, 2018; 9 pages.
Great Britain Patent Application No. 1300853.7; Search Report; dated Apr. 9, 2013; 3 pages.
International Patent Application No. PCT/GB2014/050106; Search Report; dated Sep. 5, 2014; 3 pages.
International Search Report and Written Opinion dated May 9, 2014 in International Application No. PCT/GB2014/050106.

FLOW FIELD PLATES IN FUEL CELLS

CROSS REFERENCE TO RELATED APPLICATIONS

This patent application is a Continuation of U.S. patent application Ser. No. 14/761,925, filed Jul. 17, 2015, which is a National Stage patent application of International patent application PCT/GB2014/050106, filed Jan. 15, 2014, which claims the full Paris Convention benefit of and priority to United Kingdom patent application GB1300853.7 filed Jan. 17, 2013, the contents of which are incorporated by this reference as if fully set forth herein in their entirety.

BACKGROUND

The present invention relates to fluid flow plates used in fuel cell stacks to distribute fluids such as fuel, oxidant and water over active surface areas of electrodes.

Conventional electrochemical fuel cells convert fuel and oxidant into electrical and thermal energy and a reaction product. A typical fuel cell comprises a membrane-electrode assembly (MEA) sandwiched between an anode flow field plate and a cathode flow field plate. Gas diffusion layers may be disposed between each flow field plate and the MEA to better distribute the fuel and oxidant to the MEA. Gaskets may be used to separate various layers and to provide requisite seals. The flow field plates typically include one or more channels extending over the surface of the plate adjacent to the MEA for delivery of fluid fuel or oxidant to the active surface of the MEA.

In a conventional fuel cell stack, a plurality of cells are stacked together, so that the anode flow field plate of one cell is adjacent to the cathode flow field plate of the next cell in the stack, and so on. In some arrangements, bipolar flow plates are used so that a single flow field plate has fluid flow channels in both sides of the plate. One side of the bipolar plate serves as an anode flow plate for a first cell and the other side of the flow plate serves as a cathode flow plate for the adjacent cell. Power can be extracted from the stack by electrical connections made to the first and last flow plate in the stack. A typical stack may comprise only a few or many tens or even hundreds of cells. The present invention is relevant to all of these various fuel cell stack constructions.

The process of forming fluid flow channels in the surfaces of the anode and/or cathode flow field plates can be achieved in a number of ways, such as by etching away, or otherwise removing, material from the surfaces of the plate in the desired channel pattern. This process is generally only suitable for plates that are thick enough to enable material removal. Another approach is to form the flow plates as corrugated plates with peaks and troughs defining the channels. This process is suitable for the formation of flow plates from very thin material.

Corrugated plates can be formed by a number of known processes including roll forming, hydroforming and pressing flat sheets using a punch and die. The present disclosure is particularly related to forming pressed plates using a pressing tool such as a punch and die. The punch and die both have surface relief features, which are used to impress corresponding features into the flat sheet.

A problem which exists in the formation of flow plates as pressed plates is that dimensional errors often arise when reproducing the surface relief features of the die into corresponding relief features in the pressed plate. For example, the flow channel widths and/or flow channel depths may vary from that intended. It is highly desirable to achieve dimensional accuracies in the flow channel features of a flow field plate of the order of ±10 microns.

It is an object of the present invention to reduce or eliminate dimensional errors in pressed flow field plates when reproducing relief features in the plates from a die.

DISCLOSURE

According to one aspect, the disclosure provides a system, devices and methods of producing a flow field plate for a fuel cell. The disclosure includes determining a relief profile of features extending across the plate along at least a first dimension of the plate; modulating the relief profile with an over-profiling parameter, as a function of the first dimension; forming a die with the modulated relief profile; pressing a flow field plate using the die with modulated relief profile to thereby produce the unmodulated relief profile in the flow field plate.

The system devices and methods may further include determining a relief profile of features extending across the plate along a second dimension of the plate orthogonal to the first dimension, and the modulating step may comprise modulating the relief profile with an over-profiling parameter as a function of the first dimension and the second dimension. The over-profiling parameter may comprise a height factor applied to the height of features in the relief profile, the height factor varying as a function of distance along at least the first dimension. The over-profiling parameter may comprise a width factor applied to the width of features in the relief profile, the width factor varying as a function of distance along at least the first dimension. The over-profiling parameter may comprise an offset to a baseline of the relief profile, the offset varying as a function of distance along at least the first dimension. The over-profiling parameter may comprise a height supplement applied to the height of features in the relief profile, the height supplement varying as a function of distance along at least the first dimension. The over-profiling parameter may comprise a width supplement applied to the width of features in the relief profile, the width factor varying as a function of distance along at least the first dimension. The relief profile may define a plurality of channels extending across the plate. The plurality of channels may have a uniform height across the flow field plate, and the modulated profile may define the plurality of channels with a non-uniform height, with channel depth increasing towards the centre of the modulated profile.

DRAWINGS

Embodiments of the present invention will now be described by way of example and with reference to the accompanying drawings in which.

FURTHER DISCLOSURE

Figure 1:
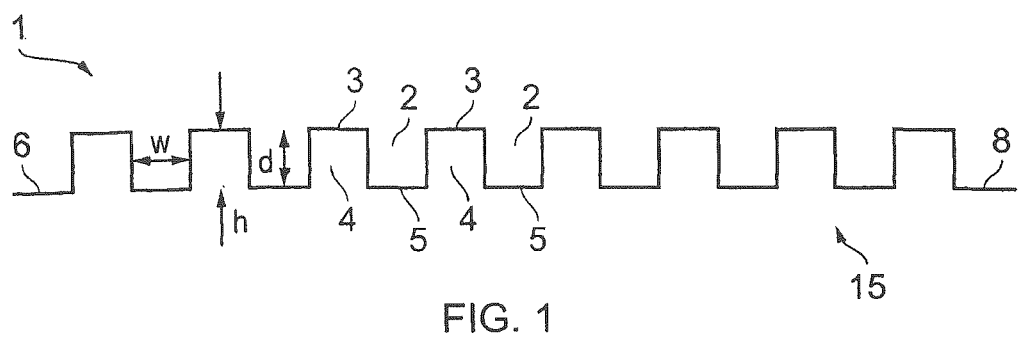
FIG. 1 shows a schematic cross-sectional relief profile of a pressed, corrugated flow field plate showing flow channels formed by peaks and troughs of the corrugated form.

FIG. 1 illustrates a portion of a corrugated pressed flow field plate 1 in cross-section. Flow channels in a first side of the plate 1 are formed as troughs 2 between peaks 3. In a bipolar plate, the troughs 2 in the first side of the pressed plate 1 that form peaks 5 in the second (i.e. opposite) side of the pressed plate 1 and the peaks 3 in the first side of the pressed plate that form troughs 4 in the second side of the plate serve to provide flow channels in both sides of the plate.

Each channel 2 has a depth d and a width w as shown in FIG. 1. More generally, the plate 1 may be described as having pressed features having a feature height h, corresponding to the channel depth d or the peak-to-peak spacing. The pressed features may have a feature width w.

Figure 2:
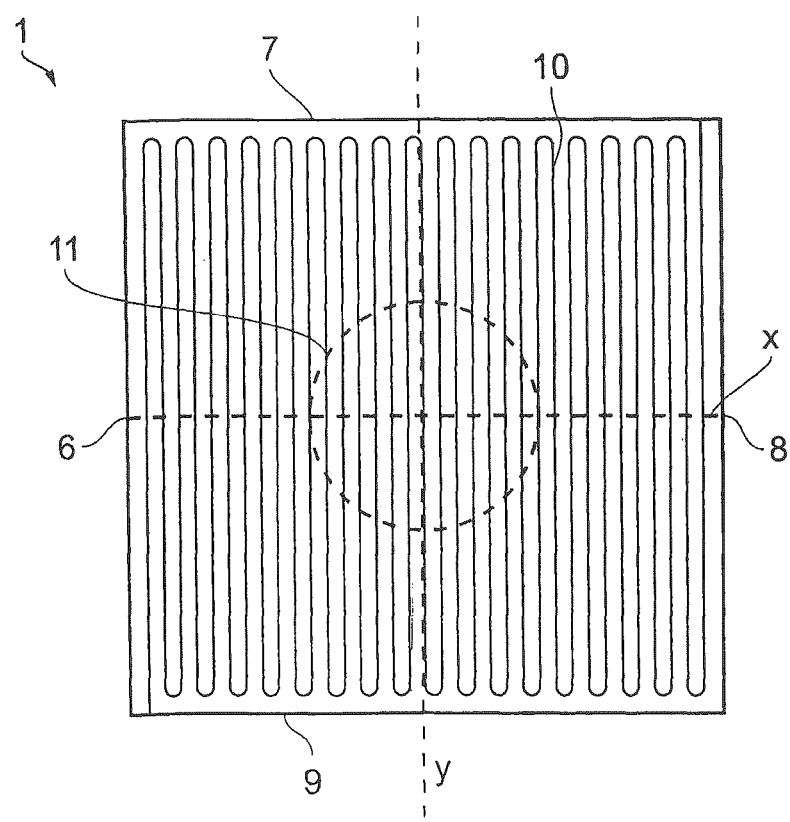
FIG. 2 shows a schematic plan view of a pressed, corrugated flow field plate similar to that of FIG. 1.

As seen in FIG. 2, in a fluid flow plate a typical feature set of a flow plate comprises a serpentine channel 10, or a series of parallel channels, formed by the corrugations in the pressed plate 1. The pressed plate has peripheral edges 6, 7, 8, 9, with edges 6 and 8 also depicted in FIG. 1. For convenience, these edges may be respectively referred to as left edge 6, top edge 7, right edge 8 and bottom edge 9. However, throughout this specification, descriptors relating to relative orientation and position, such as "top", "bottom", "horizontal", "vertical", "left", "right", "up", "down", "front", "back", as well as any adjective and adverb derivatives thereof, are used in the sense of the orientation of features as presented in the drawings and are not intended to be in any way limiting to an intended use of the described or claimed invention. Also shown for convenience in FIG. 2 is an x-y axis to refer to spatial locations within the plane of the plate. The relief features (e.g. channels) have a height or depth that extends along the z-axis out of the x-y plane.

It has been noted that dimensional errors may occur in the pressed feature dimensions. Dimensions of the features in the pressed plate may differ from the corresponding dimensions of the relief features in the die used to form those features in the pressed plate. Furthermore, it has been noted that the dimensional errors may vary as a function of the x-y position of the respective feature in the pressed plate. In some examples, it is found that the channel depths in the pressed plate become shallower towards the centre region 11 of the pressed plate, even where the die provides a regular channel depth across the die. This may occur along both the x and y axes shown in FIG. 2, although the magnitude of the dimensional errors as a function of x position compared to the magnitude of the dimensional errors as a function of y position may be different, and may also be influenced by the particular pattern of the features being created. For example, in the channel arrangement of FIG. 2, there may be more dimensional error in features along the x-axis (orthogonal to the direction of the channels) than in features along the y-axis (parallel to the direction of the channels).

Dimensional errors in the feature dimensions can result in a flow field plate in which delivery of fluid fuel and/or oxidant and/or water to the active surface of a fuel cell is insufficiently uniform, resulting in undesirable performance variations across the fuel cell.

An object of the invention is to correct, mitigate or reduce the dimensional errors observed on the pressed plate. The flow field channel or channels 10 are often found to be shallow of target dimension, and in particular target feature height, in the centre of the pressed plate radiating outward to full dimension toward the outer edges. This phenomenon may be caused by material spring-back (e.g. partial elastic return) after a plate 1 is pressed between a conventional punch and die. The pressing tool may have bottomed out and formed the pressed plate 1 to the full dimension when closed, but on tool opening or release the plate material has not been sufficiently overstretched and the stresses within the plate material cause it to spring outward. Thus, the stretched material of the plate providing vertical excursions of the plate (i.e. out of the plate plane) that define the channel height h may elastically return to a lesser dimension thereby shrinking the channel height feature. Similarly, the stretched material respectively defining the bases and tops of the troughs 2 and peaks 3 having width w may also elastically return to a lesser dimension thereby shrinking the channel width features. Shrinkage of the channel width may typically be less than shrinkage observed in the channel height.

This spring-back can be cured using an adiabatic process to anneal the pressed plate and relax stresses and strains in the pressed material during the pressing process, i.e. to relax the material structure when compressed by the die plates, so that the relief features are accurately maintained after the pressing tool releases the pressed plate. However, such a process incurs additional production stages and costs.

It has been discovered that the tooling (e.g. punch and die) can be designed to provide a variable amount of over-profiling of the desired features such that the final form of a pressed plate is much closer to the design specification after spring-back of the pressed plate post-pressing. The "over-profiling" is where the tooling is altered to incorporate areas where the material is formed beyond the target or required dimension to allow for spring-back. The over-profiling (which may also be referred to as compensation) is implemented variably as a function of distance from an edge of the pressed plate in at least one dimension in the plane of the sheet, e.g. the x-dimension as shown in FIG. 2. More preferably, the over-profiling is implemented as a function of distance from an edge of the pressed plate in two orthogonal dimensions in the plane of the sheet, e.g. the x and y dimensions as shown in FIG. 2.

The expression "over-profiling" is intended to encompass a procedure in which the form the tooling (punch and/or die, hereinafter "die" or "die plates") is altered to incorporate areas where the material is formed beyond the required dimension, to allow for spring-back. Thus, the profile of the forming punch and/or die is altered to deliberately not mimic the exact profile of the features of the flow plate required such that the natural stretch and spring-back of the plate material results in a correct, desired profile of pressed plate. The degree of over-profiling is varied as a function of a distance across the pressed plate such that regions toward the centre of the plate may be over-profiled to a greater extent than regions towards the edges of the plate.

The over-profiling process comprises the following steps.

First, the desired or "target" relief profile of the plate to be pressed is defined. In one example, this may be a regular array of parallel channels as depicted in FIGS. 1 and 2, with each channel 10 being defined by a trough 2 and an adjacent pair of peaks 3 in the corrugated form of the plate. The relief profile comprises the cross-sectional profile of the set of features that extends across the plate in a particular direction or dimension in the plane of the unpressed plate. In the example shown in FIG. 1, this is the cross-sectional profile of the features extending across the x-axis of the plate, where the channels are aligned with the y-axis.

Figure 3:
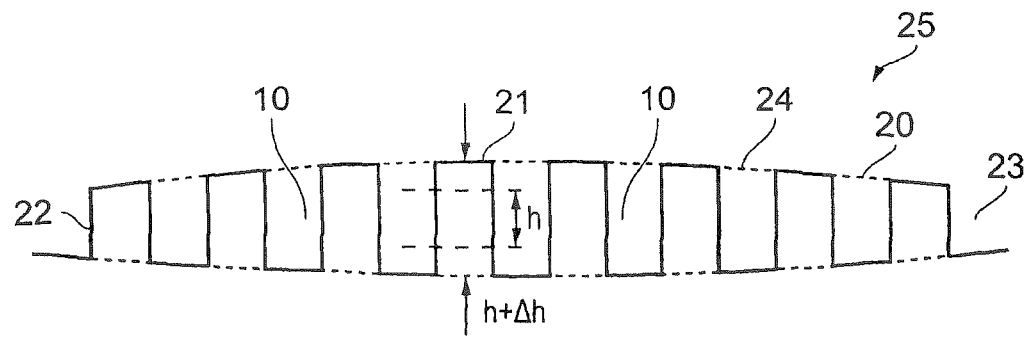
FIG. 3 shows a schematic cross-sectional profile of a modulated relief profile of a pressing tool for producing a flow field plate profile similar to FIG. 1.

In the second step, the target relief profile is modulated with an over-profiling parameter which varies as a function of distance along the particular direction or dimension of the plate over which the relief profile extends. As shown in FIG. 3, an example is shown in which the square-wave relief profile 15 of FIG. 1 (hereinafter referred to as the "unmodulated profile" 15) is modulated with an over-profiling parameter 20 indicated by a dashed line which defines a curve having a maximum towards the centre 21 of the relief profile and minima 22, 23 at the edges of the relief profile. The over-profiling parameter determines a scaling factor to be applied to the relief profile at each position along the x-axis. In this way, the over-profiling parameter provides a modulated relief profile 25 in which the feature height h becomes $h+\Delta h_x$ for each position along the x-axis.

The die of the pressing tool is then fabricated with the modulated relief profile 25. It will be understood that the schematic diagram of FIG. 3 is highly simplified and exaggerated to illustrate the principle and is not an accurate profile of a particular die form. A typical flow plate may comprise tens or hundreds of parallel channels extending across a plate width of the order of 200 mm, in which the channel depth (i.e. feature height) is of the order of 0.5 or 0.6 mm and the over-profiling parameter may add $\Delta h$ of the order of 0.10 to 0.15 mm at the centre 21 of the die.

In the fabrication of a pressed flow plate 1, the sheet material of the flow plate is pressed by the pressing tool using dies with the modulated relief profile. When the pressing tool releases the pressed material, spring-back results in a flow plate having the unmodulated or target relief profile. This completely avoids or at least mitigates the need for high temperature process to anneal the plate during the pressing process.

Modulation of the relief profile can take place in a number of ways. In the example shown in FIG. 3, the over-profiling parameter has applied an additional height to the feature sizes as a function of distance along the x-axis, where the x-axis is orthogonal to the plate channel direction. The over-profiling parameter can be applied in one dimension, e.g. the same $\Delta h_x$ for all y, or the same $\Delta h_y$ for all x. The over-profiling parameter can alternatively be applied in two dimensions, e.g. $\Delta h$ varies as a function of x and y, referred to as $\Delta h_{x,y}$. These possibilities apply to all types of relief feature, including discontinuous or intermittent channels, other fluid delivery features and more generally any relief feature shapes, and where the channel direction is not necessarily orthogonal to the x or y axis.

Figure 4:
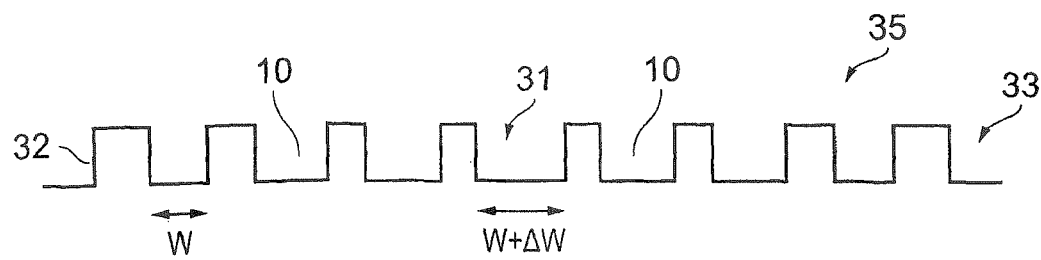
FIG. 4 shows a schematic cross-sectional profile of a modulated relief profile of a pressing tool for producing a flow field plate profile similar to FIG. 1.

The over-profiling parameter need not just be applied to feature heights (i.e. excursions in the z-direction). An alternative over-profiling parameter may adjust the width of certain features as a function of distance along the relief profile. FIG. 4 shows a simplified and exaggerated modulated relief profile 35 where the channel width w increases towards the centre of the die, such that the channel width $w+\Delta w$ at the centre 31 of the die is greater than the channel width at the edges 32, 33 of the die. This arrangement may be useful to ensure that the channel width in the pressed plate remains constant across the width of the plate. In similar manner to the over-profiling parameter of FIG. 3, the over-profiling parameter $\Delta w_x$ can be applied in one dimension, e.g. the same $\Delta w_x$ for all y, or the same $\Delta w_y$ for all x. The over-profiling parameter $\Delta w$ can alternatively be applied in two dimensions, e.g. $\Delta w$ varies as a function of x and y, referred to as $\Delta w_{x,y}$. These possibilities apply to all types of relief feature, including discontinuous or intermittent channels, other fluid delivery features and more generally any relief feature shapes, and where the channel direction is not necessarily orthogonal to the x or y axis.

The over-profiling parameters $\Delta h$ and $\Delta w$ can be used independently or together to modulate both the feature heights and widths as a function of distance along the relief profile.

The over-profiling parameters can be determined as a continuous scaling factor function that modulates the relief profile across the relevant dimension, or it can be a series of discrete scaling factors that are applied to individual features or zones of features as a function of distance along the relief profile. So, as an example, each individual channel may be provided with a different height scaling factor, or groups of adjacent channels may be allocated a group height scaling factor. The over-profiling parameters can be expressed as a multiplication factor to be applied to a feature dimension at a particular position to calculate $(h+\Delta h)$ or $(w+\Delta w)$ for any x or y, or can be expressed as a simple supplement $\Delta h$ or $\Delta w$ to be added to the unmodulated h or w for any x or y.

Figure 5:
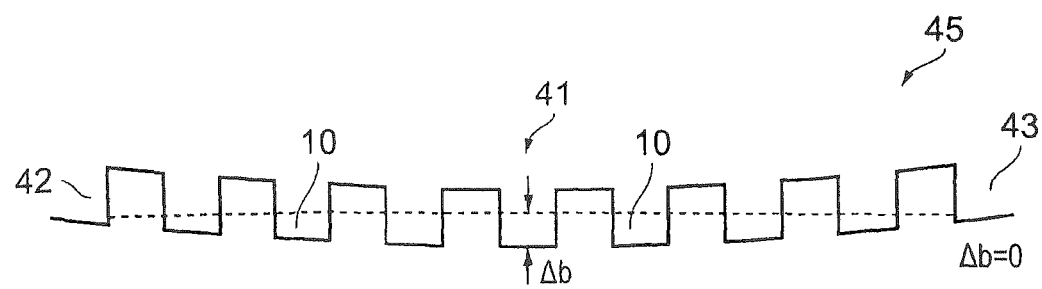
FIG. 5 shows a schematic cross-sectional profile of a modulated relief profile of a pressing tool for producing a flow field plate profile similar to FIG. 1.

The over-profiling parameter may also include a component that is independent of h and/or w. In this respect, the over-profiling parameter can include a baseline offset $\Delta b_x$ and/or $\Delta b_y$ to the unmodulated relief profile. An example is shown in FIG. 5, where a modulated relief profile 45 illustrates a baseline offset $\Delta b$ increasing towards the centre of the relief profile and diminishing to zero at the edges of the relief profile. In this respect, the baseline offset does not locally increase the height or width of the relief features, e.g. channels 10, but introduces a convexity into the die profile. The convexity of the die profile may be applied to both dies used to press a plate, i.e. both die surfaces are convex thereby increasing the pressing force towards the centre of the plate and thereby compressing a plate being formed harder in the central regions that towards the edges. This also results in the plate material being pressed first towards the centre of the plate allowing the plate material to be drawn in more in the centre region of the plate before further draw-in of material is prevented by pressure being applied towards the edges of the plate.

Alternatively, the dies may be profiled such that the baseline offset generates a generally convex die surface in one die and a generally concave die surface in the other die. The respective convexity and concavity may be complementary or different, to locally vary the pressure applied to the plate material during pressing.

Tests of modulated relief profiles for pressing tool dies which compensate for material spring-back are discussed below. The tests were carried out using a 50 ton hydraulic press.

A reference punch and die form tool was constructed with unhardened tool steel. Relief features included straight ribs (with radii on the corners) cut on a wire eroder to define fluid flow channels in a pressed plate. In the reference tool, all the ribs were equal in depth across the entire surface of the die. The relief features in a pressed plate produced with this tool were all of reduced height in the centre of the plate, with increasing height radiating outwards.

To test the over-profiling principle discussed above, a punch and die form tool was constructed with unhardened tool steel with a modulated relief profile corresponding to the unmodulated reference punch and die form tool. In the modulated relief profile tool, the ribs were not equal in depth but each rib was progressively deeper toward the centre of the tool along the x-axis, where the x-axis is orthogonal to the rib direction, symmetrical about a centreline along a centre rib axis. The unmodulated rib depth (feature height h) was 0.50 mm which gives a peak to peak feature height of 0.60 mm when a material thickness of 0.1 mm is included). The modulated rib depth increased to 0.659 mm at the centre rib, i.e. a maximum $\Delta h_x$ of 0.159 mm at x=0 (centreline). $\Delta h$ was decreased linearly from the centre (x=0) with increasing positive or decreasing negative x, to $\Delta h_x=0$ at $x_{max}$ (right hand edge of the die) and $x_{min}$ (left hand edge of the die). In this test, no modulation was applied in the y-direction.

Figure 6:
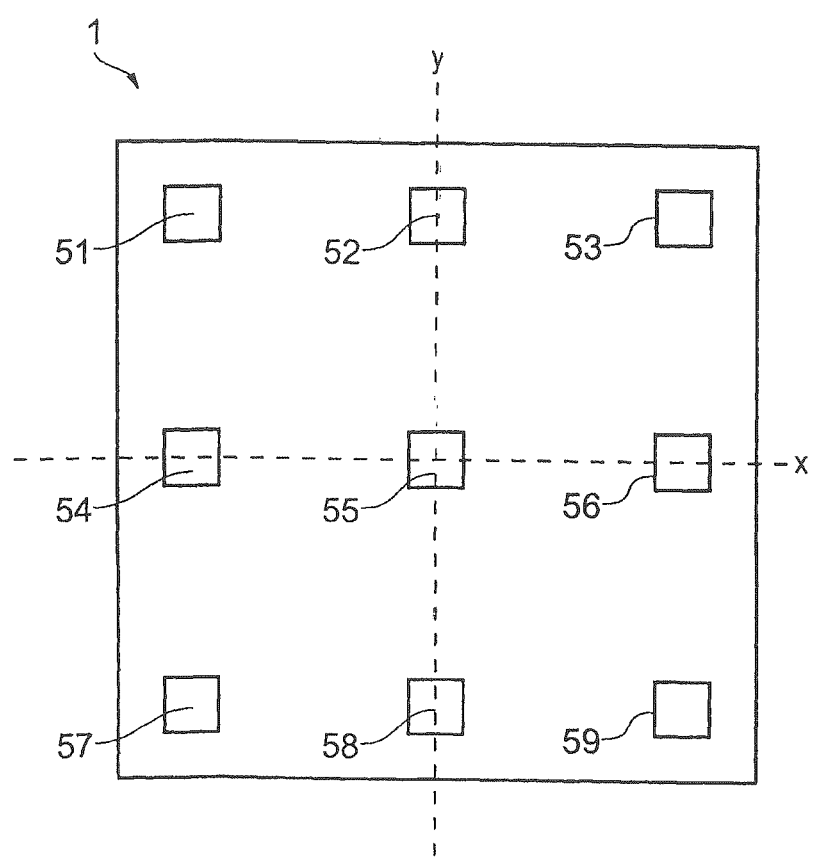
FIG. 6 shows a schematic plan view of measurement zones in a pressed plate.

The plate dimension was 200 mm×130 mm with the grain direction parallel to the channels to be formed. The 200 mm dimension is along the x-axis as shown in FIG. 6. The plate is trapped by draw ribs on either side of the tool. The 130 mm dimension is along the y-axis as shown in FIG. 6 and the plate is permitted to effectively 'draw in' to some degree along the y-axis.

Experiments were conducted using an over-profiling parameter that included a baseline offset ($\Delta b$) that resulted in a convex form of both dies. Repeated pressing of the same part with a press ram applied first to the tool centre then to each corner and the middle of both sides and finally again in the centre of the tool is also possible. Test measurements can be conveniently carried out in zones across the surface of the pressed plate, such as zones 51-59.

Results showed that it is readily possible to more than compensate for the feature height reduction in the centre of the pressed plate, it proving possible to increase the feature depth in the centre of the plate even after spring-back. It was therefore confirmed that it is possible to compensate for spring-back effects by pressing the channels deeper towards the centre of the plate.

The principles of the modulated relief profile can be applied to any suitable relief profile. Experimental testing with a given plate material can determine the appropriate over-profiling parameter to be applied for any given arrangement of feature profiles. Experimental testing will also determine the extent to which the over-profiling parameter can be applied to locally stretch the plate material without causing plate tearing due to excessive material thinning. In tests, the plate material used was 316L stainless steel (1.4404) with nominal thickness of 0.1 mm.

Edge restraints may be applied to the pressing tool at some or all of the die edges and/or in selected portions of the die edges so as to locally control the amount of plate material which can be drawn into the channels or other relief features prior to further lateral movement of the plate material being inhibited by closure of the pressing tool. After further lateral movement is inhibited, further deformation of the plate by the pressing tool requires stretching and thinning of the material, with consequential increased spring-back. The grain direction of the plate being pressed can also be taken into account when assessing the degree of over-profiling to be applied by the pressing tool.

The over-profiling process and devices described above can be applied to many different flow field channel patterns and other relief features. An advantage to this process is a potentially lower cost, higher volume manufacturing process on standard pressing equipment than may be provided by for example hydroforming and adiabatic forming processes.

Although the over-profiling technique has been described above in relation to a punch and die-based system, similar principles may be applied to a rolling press system or a hydroforming system.

The invention claimed is:

1. A flow field plate for a fuel cell, comprising:
   a plate with a relief profile extending along at least a first dimension of the plate;
   said plate having a plurality of channels extending across the plate, the plurality of channels having a uniform height across the flow field plate, and
   wherein the relief profile defines the plurality of channels with a non-uniform height, with channel depth increasing towards the center of the modulated relief profile.

2. The plate of claim 1, further comprising a relief profile of features extending across the plate along a second dimension of the plate orthogonal to the first dimension.

3. The plate of claim 2, wherein the relief profile comprises a height factor applied to the height of features in the relief profile, the height factor varying as a function of distance along at least one of the first and second dimension.

4. The plate of claim 2, wherein the relief profile comprises a width factor applied to the width of features in the relief profile, the width factor varying as a function of distance along at least one of the first dimension and second dimension.

5. The plate of claim 2, which the relief profile comprises an offset to a baseline of the relief profile, the offset varying as a function of distance along at least the first dimension.

6. The plate of claim 2, in which the relief profile comprises a height supplement applied to the height of features in the relief profile, the height supplement varying as a function of distance along at least one of the first and second dimensions.

7. The plate of claim 2, in which the relief profile comprises a width supplement applied to the width of features in the relief profile, the width factor varying as a function of distance along at least one of the first and second dimension.

8. The plate of claim 1, which the relief profile comprises an offset to a baseline of the relief profile, the offset varying as a function of distance along at least the first dimension.

9. The plate of claim 1, in which the relief profile comprises a height supplement applied to the height of features in the relief profile, the height supplement varying as a function of distance along at least the first dimension.

10. The plate of claim 1, in which the relief profile comprises a width supplement applied to the width of features in the relief profile, the width factor varying as a function of distance along at least the first dimension.

11. The plate of claim 1, further comprising, introducing one of concavity and convexity into the profile via a baseline offset $\Delta bx$ and/or $\Delta by$ to the relief profile.

* * * * *